(12) United States Patent
Sanders et al.

(10) Patent No.: US 7,250,144 B2
(45) Date of Patent: Jul. 31, 2007

(54) PERCHLORATE REMOVAL FROM SODIUM CHLORATE PROCESS

(75) Inventors: Keenan D. Sanders, Columbus, MS (US); Kevin E. Partlow, Tupelo, MS (US)

(73) Assignee: Tronox LLC, Oklahoma City, OK (US)

( * ) Notice: Subject to any disclaimer, the term of this patent is extended or adjusted under 35 U.S.C. 154(b) by 143 days.

(21) Appl. No.: 11/126,941

(22) Filed: May 11, 2005

(65) Prior Publication Data

US 2006/0254926 A1   Nov. 16, 2006

(51) Int. Cl.
  *B01B 9/02* (2006.01)
(52) U.S. Cl. .................. 422/245.1; 117/68
(58) Field of Classification Search .......... 117/68; 422/245.1
  See application file for complete search history.

(56) References Cited

U.S. PATENT DOCUMENTS

| | | | |
|---|---|---|---|
| 4,702,805 A | 10/1987 | Burkell et al. | |
| 5,063,041 A | 11/1991 | Wanngard | |
| 5,104,500 A * | 4/1992 | Ruthel | 205/503 |
| 5,322,598 A | 6/1994 | Cawlfield et al. | |
| 5,681,446 A | 10/1997 | Betts et al. | |

OTHER PUBLICATIONS

Tilak, B.V., "Electrolytic Sodium Chlorate Technology: Current Status", Proceeding vol. 99-21, p. 8, *The Electrochemical Society Inc.* (1999), 32 Pages.

* cited by examiner

*Primary Examiner*—Felisa Hiteshew
(74) *Attorney, Agent, or Firm*—Chapin IP Law, LLC; Stanley K. Hill, Esq.; Barry W. Chapin, Esq.

(57) ABSTRACT

Novel methods for the removal of sodium perchlorate from electrolytic processes for the production of sodium chlorate have been discovered, allowing sodium chlorate production processes to proceed with low levels of sodium perchlorate. A portion of the mother liquor from the sodium chlorate crystallization is fed to a secondary crystallization step to concentrate sodium perchlorate in a second mother liquor. In this manner, at least a portion of the sodium perchlorate in the sodium chlorate production process is isolated in the second mother liquor, which can be removed from the sodium chlorate production process. The process is run until the concentration of sodium perchlorate in the second mother liquor reaches a desired concentration, at which point at least a portion of the second mother liquor can be removed, thereby removing a portion of the sodium perchlorate from the sodium chlorate production process. The removal of sodium perchlorate from the electrolytic production process allows extended process operating time, improved raw material utilization, and improved reaction efficiency.

8 Claims, 2 Drawing Sheets

PERCHLORATE REMOVAL FROM SODIUM CHLORATE PROCESS

FIELD OF THE INVENTION

The present invention generally relates to the production of sodium chlorate by the electrolysis of an aqueous solution of sodium chloride. More specifically, the present invention relates to the removal of perchlorate from the electrolytic production process.

BACKGROUND OF THE INVENTION

The electrosynthesis of sodium chlorate ("NaClO$_3$") by the electrolysis of sodium chloride solutions in an electrolysis cell has been known in the art for a long time and is generally described by the following reaction:

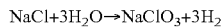

$$NaCl + 3H_2O \rightarrow NaClO_3 + 3H_2$$

The reaction proceeds only partially and the resulting aqueous solution of sodium chlorate and sodium chloride is typically referred to as a cell liquor. Sodium chlorate is obtained by selective crystallization from this cell liquor. The remaining liquor after selective crystallization of sodium chlorate is typically referred to as the mother liquor. The mother liquor is recycled to the electrolysis reaction, generally after addition of make-up sodium chloride.

There are several processes occurring in the electrolysis cell that can increase the energy consumption per ton of chlorate produced by lowering cell efficiency and/or increasing cell voltage. For example, the formation of sodium perchlorate ("NaClO$_4$") in the cell (by direct electrochemical oxidation of sodium chlorate) and its subsequent accumulation affects the function of the anode and reduces the solubility of sodium chloride in the electrolyte.

The formation of sodium perchlorate especially becomes an issue in view of the recent trend in the manufacture of sodium chlorate toward producing the sodium chlorate in closed loop processes so that there is reduced effluent discharge to the plant. In such a closed loop process or closed loop system, the mother liquor produced from the cell liquor by the removal of crystalline sodium chlorate is recycled to an earlier point in the process or system. Significant amounts of sodium perchlorate can accumulate in closed loop processes for the production of sodium chlorate.

Methods for the removal of sodium perchlorate are known in the art. For example, the addition of potassium chloride results in removal of the perchlorate in the form of potassium perchlorate. However, the addition of potassium chloride represents a significant operating expense for the sodium chlorate production process. Accordingly, there is still a need in the industry for improved methods for removal of perchlorate from an electrolytic process for producing sodium chlorate.

SUMMARY OF THE INVENTION

Novel methods for the removal of sodium perchlorate from electrolytic processes for the production of sodium chlorate have been discovered. According to the present invention, at least a portion of the mother liquor from the sodium chlorate crystallization is fed to a secondary crystallization step to concentrate sodium perchlorate in a second mother liquor. The solids which are formed in the secondary crystallization step are isolated and recycled to the sodium chlorate production process at a point prior to the primary crystallization step. The solids formed in the secondary crystallization step are washed with either the first mother liquor or the second mother liquor. The spent wash solution is returned to the second mother liquor in the secondary crystallization step. The process is run until the concentration of sodium perchlorate in the second mother liquor reaches a desired concentration, at which point at least a portion of the second mother liquor can be removed, thereby removing a portion of the sodium perchlorate from the sodium chlorate production process. The removal of sodium perchlorate from the electrolytic production process allows extended process operating time, improved raw material utilization, and improved reaction efficiency.

DESCRIPTION OF THE DRAWINGS

The present invention is illustrated by way of example in the following drawings in which like references indicate similar elements. The following drawings disclose various embodiments of the present invention for purposes of illustration only. The drawings are not intended to limit the scope of the invention.

DETAILED DESCRIPTION OF PREFERRED EMBODIMENTS OF THE INVENTION

In the following detailed description of preferred embodiments of the present invention, reference is made to the accompanying Drawings, which form a part hereof, and in which are shown by way of illustration specific embodiments in which the present invention may be practiced. It should be understood that other embodiments may be utilized and changes may be made without departing from the scope of the present invention.

Figure 1:
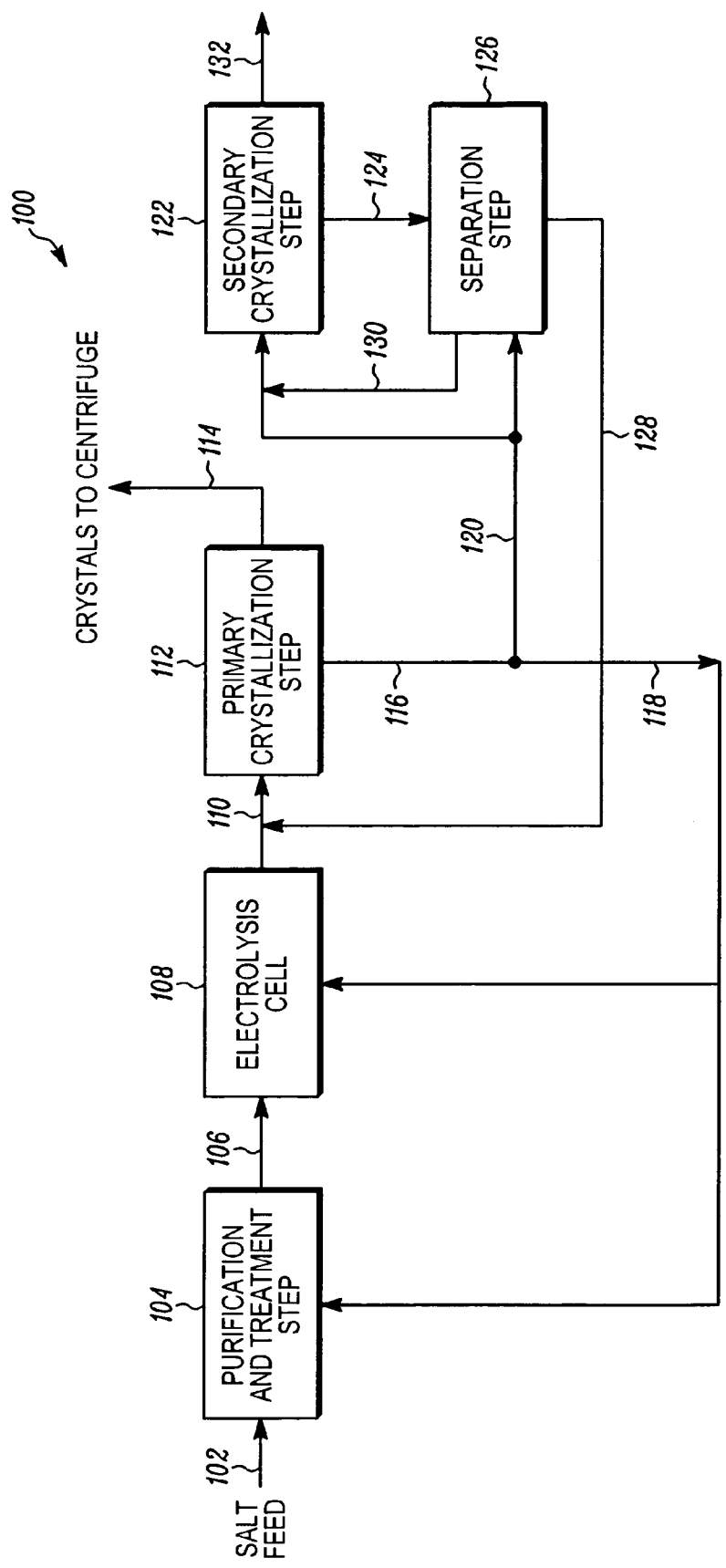
FIG. 1 illustrates a flow diagram of a process according to the present invention.

A sodium chlorate production process 100 modified in accordance with the present invention is illustrated in FIG. 1. The salt feed 102 (aqueous sodium chloride solution) is fed to a purification and treatment step 104 to produce a saturated sodium chloride solution 106 (treated brine) suitable for use in an electrolysis cell 108. Various impurities in the salt feed can have an adverse effect on the process, so it is preferred to remove them. For example, calcium and magnesium cations can affect the operation of the electrolysis cell resulting in increasing cell voltage, reduced cell efficiencies, and hence the costs associated with the energy consumption of the cells. Sulfates may result in the deposition of calcium sulfate scale on heat exchanger surfaces or contamination of the sodium chlorate product. Fluorides can react with the anode, shortening anode life. Removal of impurities can be accomplished by methods known in the art. For example, calcium, magnesium, fluoride, sulfate and iron can be removed by addition of Na$_2$CO$_3$, NaCO$_3$, Na$_3$PO$_4$, BaCl$_2$, and NaOH, which can form insoluble compounds with the various impurities. The insoluble compounds are removed as precipitates through filtering processes. Ion-exchange resins may also be used for further removal of many cations. Other impurities or components may also be present in the salt feed. For example, sodium dichromate is a conventional multifunctional additive widely used in the commercial manufacture of sodium chlorate for suppression of OCl$^-$ and ClO$_3^-$ reactions, enhanced buffering of the electrolyte, and inhibition of the anodic oxygen evolution reaction. Various techniques for removing impurities may be employed without departing from the scope of the present invention.

The treated brine 106 is fed to an electrolysis cell 108 for electrolysis of the aqueous sodium chloride solution therein to form a cell liquor 110 containing sodium chlorate. Typically, HCl or $Cl_2$ is fed to the electrolysis cell 108 to maintain the desired pH for sodium chlorate formation. The pH in the electrolysis cell 108 is typically at least about 5.9, and preferably at least about 6.2. The pH in the electrolysis cell 108 is typically at most about 6.7, and preferably at most about 6.4. Since chemical chlorate formation typically proceeds slowly, a relatively large volume of a chemical reaction zone is needed for the electrolysis. A cooling zone (not illustrated in FIG. 1) is also generally used to remove excess heat generated from the reaction and control the operating temperature in the electrolysis cell. Typically, the temperature is from about 63° C. to about 79° C. The cooling zone may be located within the electrolysis cell 108 or in a separate heat exchanger. Cooling zones useful with the present invention are known in the art.

Hydrogen gas is generated during electrolysis and is generally released from the cell liquor 110 in the electrolysis cell 108 or a separate vessel (not illustrated in FIG. 1). Typically, $OCl^-$ and HOCl are removed from the cell liquor 110 in a further step (not shown in FIG. 1, but conventionally known and practiced) because these species can promote severe corrosion of process equipment and also lower the overall process efficiency. Typically, removal of $OCl^-$ and HOCl is accomplished by treatment with $Na_2SO_3$, $NH_3$, $(NH_2)_2CO$ or $H_2O2$. Treatment with $H_2O_2$ is preferred.

The cell liquor 110 is then fed to a primary crystallization step 112. In the primary crystallization step 112, a first amount of crystalline sodium chlorate 1 14 is separated from the cell liquor 110 using techniques known in the art, forming a first mother liquor 116. Water is also evaporated during the primary crystallization step 112 using techniques known in the art. According to the present invention, the first mother liquor 116 from the primary crystallization step 112 is separated into two streams: a first mother liquor recycle stream 118 and a secondary crystallization step feed stream 120. In one example of the present invention, the feed rate of the first mother liquor recycle stream 118 is from about 450 to about 500 gal./min. and the feed rate of the secondary crystallization step feed stream 120 is about 30 gal./min.

The first mother liquor recycle stream 118 is recycled to the sodium chlorate production process, prior to the primary crystallization step 112. The first mother liquor recycle stream 118 can be recycled to various points, depending on the needs of the particular sodium chlorate production process. For example, the first mother liquor recycle stream 118 can be fed to the brine purification and treatment step 104, the electrolysis cell 108, and/or the cell liquor 110.

At least a majority portion of the secondary crystallization step feed stream 120 is fed to a secondary crystallization step 122, wherein a second mother liquor is formed by removing solids containing sodium chlorate. The secondary crystallization step 122 can be performed using equipment known in the art such as a vacuum crystallizer. Generally, the secondary crystallization step 122 can be performed using the same type of equipment that is used to perform the primary crystallization step 112. The purpose of the secondary crystallization step 122 is to concentrate sodium perchlorate in solution, typically by evaporation. A slurry discharge 124 containing the sodium chlorate solids which are formed in the secondary crystallization step 122 is fed to a separation step 126. The separation step 126 is typically performed in a cyclone or centrifuge.

A minority portion of the secondary crystallization step feed stream 120 is used in the illustrated embodiment to wash the sodium chlorate solids in the slurry discharge 124, in conjunction with the separation step 126. Alternatively, as has already been mentioned, all of the secondary crystallization step feed stream 120 may be fed to the secondary crystallization step 122, and the sodium chlorate solids washed with the second mother liquor.

In either case, the spent wash solution 130 leaving the separation step 126 is recycled back to the secondary crystallization step 122 and is mixed with the secondary crystallization step feed stream 120 that is fed to the secondary crystallization step 122. In this manner, sodium perchlorate is not removed from the secondary crystallization step 122 and builds up in the second mother liquor. Washed sodium chlorate solids 128 from separation step 126 are returned to the sodium chlorate process 100 at a point prior to the primary crystallization step 112. For example, the washed sodium chlorate solids 128 can be combined with the cell liquor 110 as shown in FIG. 1.

Once the concentration of sodium perchlorate in the second mother liquor reaches a desired level, the second mother liquor can be removed 132 from the production process 100, thereby removing at least a portion of the accumulated sodium perchlorate from the production process 100. The second mother liquor should be removed from the production process 100 before the concentration of sodium perchlorate becomes so high that the sodium perchlorate starts to crystallize. That is, it is desirable for the sodium perchlorate to remain in solution. Accordingly, the second mother liquor should be removed from the production process 100 before the concentration of sodium perchlorate reaches about 1000 grams/liter. Preferably, the second mother liquor is removed when the sodium perchlorate concentration is greater than about 750 grams/liter.

Except for the removal of the second mother liquor, processes for producing sodium chlorate according to the present invention are closed loop processes in that the mother liquor is recycled back into an earlier stage of the process. Storage vessels, transfer lines, heat exchangers, evaporators, crystallizers and other related equipment well known in the art may be utilized without departing from the scope of the present invention.

EXAMPLES

In accordance with the present invention, sodium chlorate was produced using a closed loop process as described in FIG. 1 and accompanying text. The cell liquor 110 was thus fed to a first vacuum crystallizer for the primary crystallization step 112. A majority portion of the second crystallization step feed stream 120 was fed to a second vacuum crystallizer for the secondary crystallization step 122, together with spent wash solution 130 from a separation step 126 following the secondary crystallization step 122, so that over time as described above sodium perchlorate from cell liquor 110 became concentrated in the second mother liquor.

Figure 2:
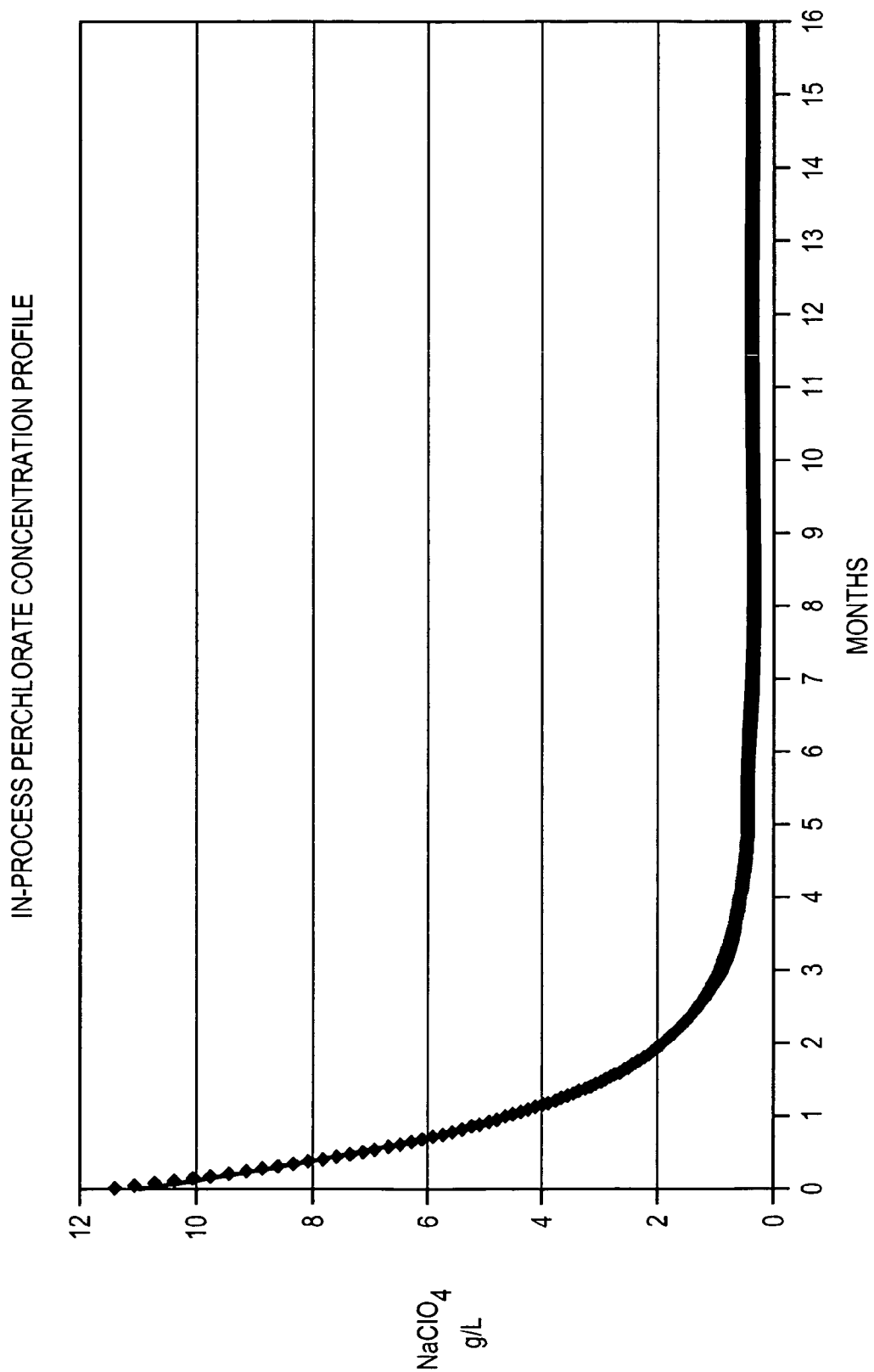
FIG. 2 illustrates concentration over time of the sodium perchlorate in the first mother liquor from a process according to the present invention.

The concentration of sodium perchlorate in the first mother liquor 116 was measured after each day the process was run. FIG. 2 shows a graph of the sodium perchlorate concentration as measured in the first mother liquor 116 over time. The measured sodium perchlorate concentration started at 14 g/L and decreased quickly. After 165 days, the measured sodium perchlorate concentration decreased to below about 1 g/L and stayed below 1 g/L for the remainder of the time. After 199 days, the measured sodium perchlorate concentration decreased to below about 0.46 g/L and stayed below 0.46 for the remainder of the time. The sodium perchlorate concentration in the first mother liquor 116 stabilized at about 0.44 g/L. The process was continued until the sodium perchlorate concentration of the second mother liquor in the second vacuum crystallizer reached about 786 g/L. At this point, the second mother liquor was removed from the secondary vacuum crystallizer, thereby removing the accumulated sodium perchlorate from the sodium chlorate production process.

The present invention enables sodium chlorate production processes to proceed with dramatically reduced levels of sodium perchlorate. The removal of sodium perchlorate from the electrolytic sodium chlorate production process allows extended process operating times, improved raw material utilization, and improved reaction efficiency. Sodium chlorate production processes according to the present invention can additionally produce a second mother liquor having a high concentration of sodium perchlorate. It is anticipated that this produced second mother liquor will itself have valuable industrial uses.

While the present invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and by equivalents thereto.

What is claimed is:

1. A method comprising:
   electrolyzing an aqueous solution containing sodium chloride to form an aqueous solution containing sodium chlorate and sodium chloride;
   crystallizing sodium chlorate from the aqueous solution containing sodium chlorate and sodium chloride to form a mother liquor and sodium chlorate crystals;
   separating the sodium chlorate crystals from the mother liquor;
   recycling the mother liquor; and
   maintaining a sodium perchlorate concentration in the mother liquor below about 1 g/L.

2. The method of claim 1, wherein the sodium chlorate is produced in a closed loop system and wherein the sodium perchlorate concentration in the mother liquor is maintained below about 1 g/L by segregating sodium perchlorate produced in the electrolysis step, and continuously or from time to time removing a sufficient amount of the segregated sodium perchlorate to maintain the sodium perchlorate concentration in the mother liquor below about 1 g/L.

3. The method of claim 2, wherein the sodium perchlorate concentration is maintained below about 0.46 g/L.

4. The method of claim 1, wherein the sodium perchlorate concentration is maintained below about 0.46 g/L.

5. A method comprising:
   electrolyzing an aqueous solution containing sodium chloride to form an aqueous solution containing sodium chlorate and sodium chloride;
   crystallizing sodium chlorate from the aqueous solution containing sodium chlorate and sodium chloride to form a first mother liquor and a first amount of sodium chlorate crystals;
   separating the first amount of sodium chlorate crystals from the first mother liquor;
   separating the first mother liquor into a first stream and a second stream;
   recycling the first stream;
   crystallizing sodium chlorate from at least a portion of the second stream to form a second mother liquor and a second amount of sodium chlorate crystals;
   separating the second amount of sodium chlorate crystals from the second mother liquor;
   washing the second amount of sodium chlorate crystals with a portion of the second stream from the first mother liquor not fed to the secondary crystallization step or with the second mother liquor;
   returning the spent wash stream from the washing step to the secondary crystallization step; and
   removing at least a portion of the second mother liquor when the second mother liquor reaches a certain concentration of sodium perchlorate.

6. The method of claim 5, wherein the certain concentration of sodium perchlorate in the removed second mother liquor is less than about 1000 g/L.

7. The method of claim 5, wherein the certain concentration of sodium perchlorate in the removed second mother liquor is at least about 750 g/L.

8. A solution concentrated in sodium perchlorate, wherein the solution corresponds to the removed second mother liquor and is produced by the method of claim 5.

* * * * *